(12) United States Patent
Wu et al.

(10) Patent No.: US 11,005,703 B1
(45) Date of Patent: May 11, 2021

(54) METHOD, DEVICE, AND PRODUCT FOR MANAGING APPLICATION NODES IN A DISTRIBUTED APPLICATION SYSTEM

(71) Applicant: EMC IP Holding Company LLC, Hopkinton, MA (US)

(72) Inventors: Pengfei Wu, Shanghai (CN); Tianxiang Chen, Shanghai (CN); WuiChak Wong, Xiamen (CN); Zhen Jia, Shanghai (CN); Qing Li, Nanjing (CN); Bo Wei, Shanghai (CN); ChunXi Chen, Shanghai (CN); Bin He, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/804,175

(22) Filed: Feb. 28, 2020

(30) Foreign Application Priority Data

Nov. 29, 2019 (CN) .......................... 201911206409.8

(51) Int. Cl.
*H04L 12/24* (2006.01)
*H04L 29/08* (2006.01)

(52) U.S. Cl.
CPC ...... *H04L 41/0668* (2013.01); *H04L 41/0677* (2013.01); *H04L 67/10* (2013.01)

(58) Field of Classification Search
CPC .. H04L 41/0668; H04L 67/10; H04L 41/0677
See application file for complete search history.

(56) References Cited

U.S. PATENT DOCUMENTS

2014/0281744 A1* 9/2014 Elias .................. G06F 11/0709
714/48

OTHER PUBLICATIONS

P. Maymounkov et al., "Kademlia: A Peer-to-Peer Information System Based on the XOR Metric," First International Workshop on Peer-to-Peer Systems (IPTPS), Mar. 7-8, 2002, 6 pages.
U.S. Appl. No. 16/795,766 filed in the name of Ruixue Zhang et al. Feb. 20, 2020, and entitled "Methods, Devices and Computer Program Products for Storing and Accessing Data."

* cited by examiner

*Primary Examiner* — El Hadji M Sall
(74) *Attorney, Agent, or Firm* — Ryan, Mason & Lewis, LLP

(57) ABSTRACT

The present disclosure relates to a method, device and product for managing application nodes in a distributed application system. In a method, status of a plurality of application nodes in the distributed application system is obtained. A failed application node is determined among the plurality of application nodes based on the obtained status. A parent application node of the failed application node is determined according to a hierarchical structure of the distributed application system, the hierarchical structure describing connection relationships among the plurality of application nodes. An additional mapping entry that describes an association relationship between the failed application node and the parent application node is added to a node mapping relationship of the distributed application system, a mapping entry in the node mapping relationship describing an association relationship between an application node among the plurality of application nodes and an address of the application node in the distributed application system.

20 Claims, 9 Drawing Sheets

METHOD, DEVICE, AND PRODUCT FOR MANAGING APPLICATION NODES IN A DISTRIBUTED APPLICATION SYSTEM

RELATED APPLICATION(S)

The present application claims priority to Chinese Patent Application No. 201911206409.8, filed Nov. 29, 2019, and entitled "Method, Device, and Product for Managing Application Nodes in a Distributed Application System," which is incorporated by reference herein in its entirety.

FIELD

Various implementations of the present disclosure relate to distributed application systems, and more specifically, to a method, device and computer program product for managing application nodes in a distributed application system.

BACKGROUND

With the development of network technology, a large number of distributed application systems have emerged. A traffic status monitoring system is one example of a distributed application system. In the traffic status monitoring environment, mobile application nodes deployed on vehicles and fixed application nodes deployed on roadside facilities may monitor road status. These nodes may transmit the monitored data to a device such as a monitoring server and the like for further processing. A production line monitoring system is another example of a distributed application system. In the production line monitoring environment, application nodes may be deployed at a plurality of locations in a factory's production line so as to collect operation status of the production line. These application nodes may be connected to a monitoring server and further connected to a datacenter.

In a distributed application system, various application nodes may have computing and storage capabilities. The application node may publish data to the outside and access data from one or more other application nodes. At this point, managing a large number of application nodes in a distributed application environment has become a focus of research.

SUMMARY

Therefore, it is desirable to develop and implement a technical solution for managing an application system more effectively. It is desired that the technical solution be compatible with existing application solutions to more effectively manage tasks in application systems by reconstructing configurations of existing application systems.

According to a first aspect of the present disclosure, a method is provided for managing application nodes in a distributed application system. In the method, status of a plurality of application nodes in the distributed application system is obtained. A failed application node is determined among the plurality of application nodes based on the obtained status. A parent application node of the failed application node is determined according to a hierarchical structure of the distributed application system, the hierarchical structure describing connection relationships among the plurality of application nodes. An additional mapping entry that describes an association relationship between the failed application node and the parent application node is added to a node mapping relationship of the distributed application system, a mapping entry in the node mapping relationship describing an association relationship between an application node among the plurality of application nodes and an address of the application node in the distributed application system.

According to a second aspect of the present disclosure, an electronic device is provided, the electronic device comprising: at least one processor; and a memory coupled to the at least one processor, the memory having instructions stored thereon, the instructions, when executed by the at least one processor, causing the electronic device to perform acts for managing application nodes in a distributed application system. The acts include: obtaining status of a plurality of application nodes in the distributed application system; determining a failed application node among the plurality of application nodes based on the obtained status; determining a parent application node of the failed application node according to a hierarchical structure of the distributed application system, the hierarchical structure describing connection relationships among the plurality of application nodes; and adding to a node mapping relationship of the distributed application system an additional mapping entry that describes an association relationship between the failed application node and the parent application node, a mapping entry in the node mapping relationship describing an association relationship between an application node among the plurality of application nodes and an address of the application node in the distributed application system.

According to a third aspect of the present disclosure, a computer program product is provided. The computer program product is tangibly stored on a non-transitory computer-readable medium and comprises machine-executable instructions which are used to implement a method according to the first aspect of the present disclosure.

BRIEF DESCRIPTION OF THE DRAWINGS

Through a more detailed description in the accompanying drawings, features, advantages and other aspects of the implementations, the present disclosure will become more apparent. Several implementations of the present disclosure are illustrated schematically and are not intended to limit the present invention. In the drawings.

DETAILED DESCRIPTION

Example implementations of the present disclosure will be described in more detail with reference to the drawings. Although the drawings illustrate example implementations of the present disclosure, it should be appreciated that the present disclosure can be implemented in various ways and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first," "second" and so on can refer to same or different objects. The following text can also comprise other explicit and implicit definitions.

Figure 1:
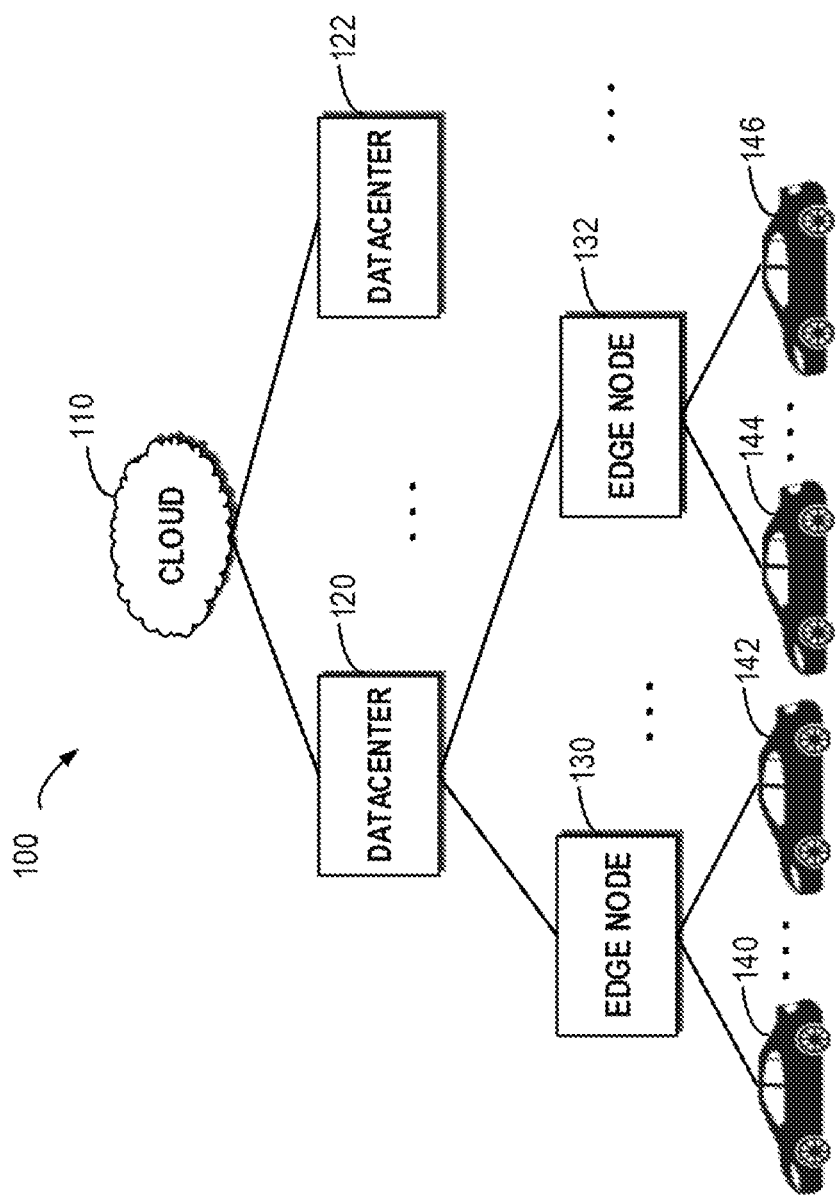
FIG. 1 schematically shows a block diagram of a hierarchical structure of application nodes in a distributed application system.

It will be understood that a system for monitoring traffic status is merely used as one example of distributed application systems below. In other example implementations of the present disclosure, the distributed application system may further be a production line monitoring system for monitoring operation status of a production line. With reference to FIG. 1, description is first presented to an application environment of example implementations of the present disclosure.

FIG. 1 schematically shows a block diagram 100 of a hierarchical structure of application nodes in a distributed application system. The tree structure schematically shows connection relationships of various application nodes in the distributed application system. As depicted, the distributed application system may comprise a plurality of layers. For example, a cloud 110 may reside at a root node and may comprise a plurality of child application systems, such as datacenters 120, ... , and 122. The datacenter 120 may further comprise child application systems, such as edge nodes 130, ... , and 132. Application systems may further exist at leaf node locations below the edge nodes. The edge node 130 may have child nodes, such as application nodes 140, ... , and 142 deployed on cars, and the edge node 132 may have child nodes, such as application nodes 144, ... , and 146 deployed on cars.

Figure 2:
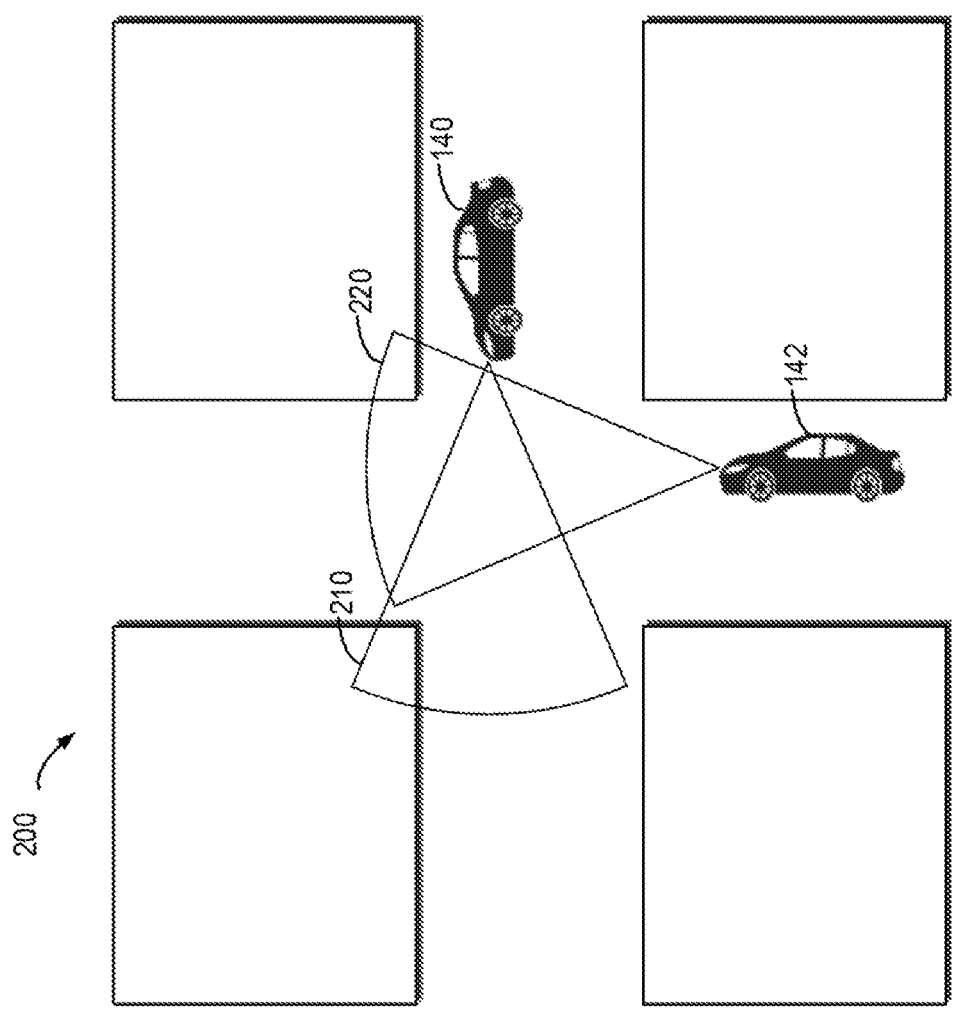
FIG. 2 schematically shows a block diagram of application nodes for collecting road information in a distributed application system for monitoring traffic status.

Here, the application nodes 140, 142, 144, ... , and 146 may collect the surrounding road status and car status with movement of the cars. FIG. 2 schematically shows a block diagram 200 of application nodes for collecting road information in a distributed application system for traffic status monitoring. As depicted, a car where the application node 140 is deployed is moving from east to west, so this application node may collect status information within a field of view 210. A car where the application node 142 is deployed is moving from south to north, so this application node may collect status information within a field of view 220.

The application nodes 140 and 142 may generate data objects related to road status based on the collected information and send the respective generated data objects to the upper-layer edge node 130. Subsequently, the edge node 130 may generate a data object that can fully reflect road status based on the data objects from the application nodes 140 and 142. In the distributed application system shown in FIG. 1, various application nodes may run independently and name files for data objects according to their own rules. For example, both the application nodes 140 and 142 may name the generated data objects "D001," "D002" and so on in chronological order. So, there will exist data objects with the same names in the entire distributed application system.

The large number of application nodes in the distributed application system may define names of to-be-published files and publish these files to the outside. Technical solutions have been provided for managing data objects in a distributed application system. In order to ensure the uniqueness of file naming, a file-based hash has been proposed as the unique identifier of a file. However, a hash is usually composed of a series of characters, and it is difficult to learn concrete contents of a file from a file name represented by a hash.

In order to increase the readability of a file name, a technical solution has been proposed to support user-named files. By adding a prefix or postfix which is represented by an identifier of an application node to a file name given by the user, the uniqueness of file naming may be ensured. For example, suppose the application node 140 names a file "D001," and an identifier of the application node 140 is "EN001," then a name of the file may be represented as the file name "EN001-D001." In this way, each file in the distributed application system may be uniquely identified. As compared with the hash comprising unordered characters, the above file name has better readability. A mapping relationship may be built between a readable file name and a file hash, via which the user may find the file hash corresponding to the readable file and further access the file.

Various rights may be granted to an application node, e.g., the right to publish a file with the identifier of the application node. For example, the application node with the identifier "EN001" may add the prefix "EN001" to a file published by itself. With the operation of the distributed application system, one or more application nodes in the distributed application system may fail. At this point, publishing and accessing data related to the failed application node(s) will be stopped, and further the reliability and stability of the whole distributed application system will be reduced. Therefore, in a distributed application system, managing various application nodes in a more reliable and effective way has become a focus of research.

Figure 3:
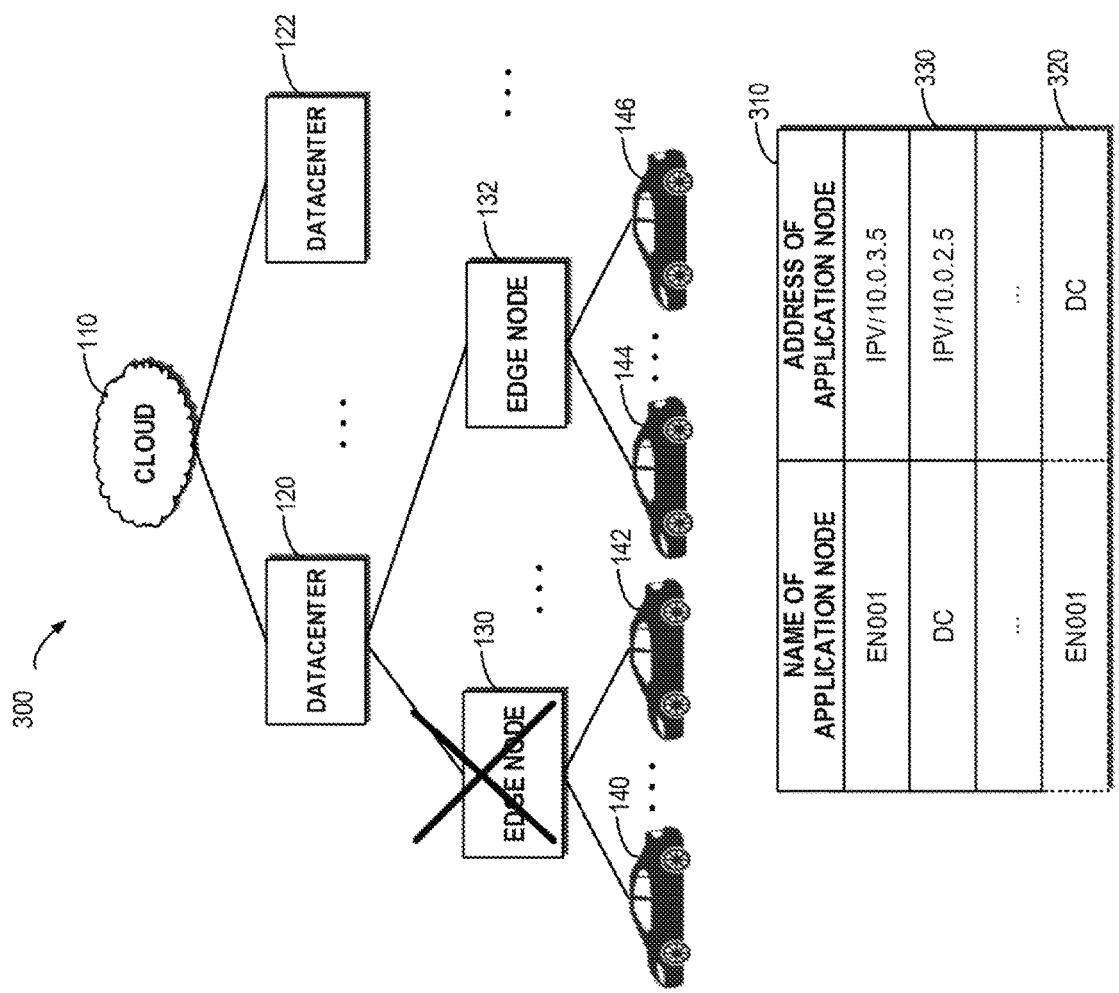
FIG. 3 schematically shows a block diagram of the process for managing application nodes in a distributed application system according to example implementations of the present disclosure.

To address the above drawbacks, a method is proposed for managing application nodes in a distributed application system according to example implementations of the present disclosure. FIG. 3 schematically shows a block diagram 300 of the process for managing application nodes in a distributed application system according to example implementations of the present disclosure. As depicted, the distributed application system may have a node mapping 310, which may indicate an association relationship between an address and a name of an application node. With readable names of application nodes, it is easy for the user and/or administrator to distinguish a plurality of application nodes in the distributed application system.

In the method, when a failed application node (e.g., the edge node 130) emerges in the distributed application system, an association relationship 320 may be built between the failed application node and a parent application node (the datacenter 120) of the failed application node. Specifically, the built association relationship 320 is shown as a dotted block in the last row in the node mapping relationship 310. Additionally, in subsequent operations of the distributed application system, the built association relationship may forward to the datacenter 120 an access request that used to target the failed application node, so that the datacenter 120 replaces the function of the failed node.

With example implementations of the present disclosure, the failed application node may be replaced by its parent application node. In this way, various nodes in the distributed application system may act normally, and further the stable running of the distributed application system may be guaranteed. More details about example implementations of the present disclosure will be described with reference to FIG. 4 below.

Figure 4:
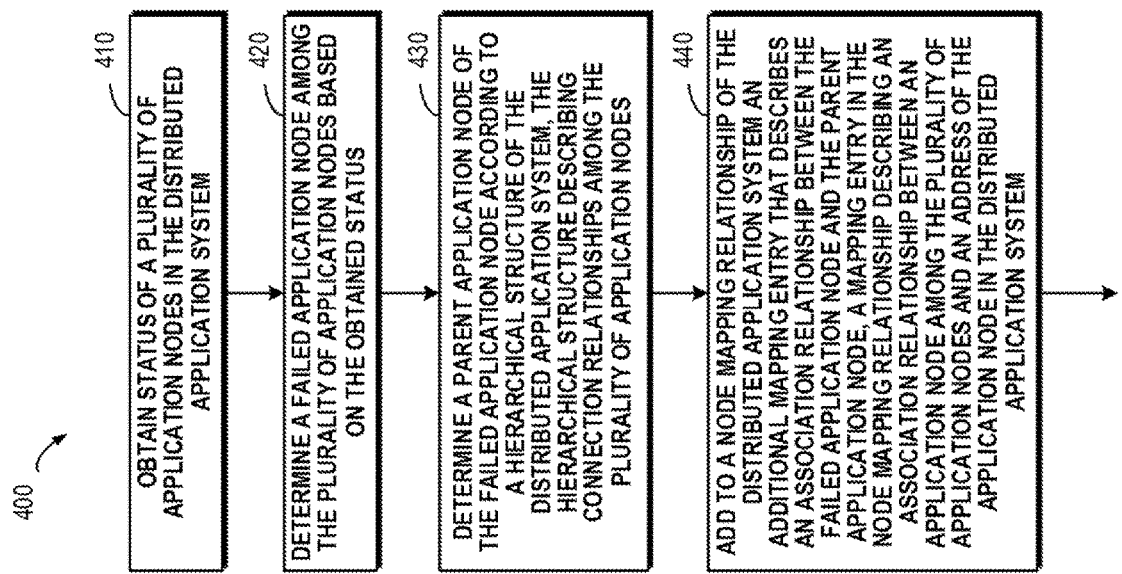
FIG. 4 schematically shows a flowchart of a method for managing application nodes in a distributed application system according to example implementations of the present disclosure.

FIG. 4 schematically shows a flowchart of a method 400 for managing application nodes in a distributed application system according to example implementations of the present disclosure. At block 410, status of a plurality of application nodes in the distributed application system may be obtained. According to example implementations of the present disclosure, status of an application node may be determined based on various information. For example, response time of the application node to an access request may be obtained, and running status of a processor of the application node may be obtained.

At block 420, a failed application node among the plurality of application nodes may be determined based on the obtained status. It may be determined based on various collected information whether an application node has failed. If an access request to an application node is not responded to for a long time, then it may be determined that the application node has failed, etc. Returning to FIG. 3, suppose a request to the edge node 130 is not responded to for a long time, then it may be determined that the edge node 130 is a failed application node.

With reference now to block 430 in FIG. 4, a parent application node of the failed application node may be determined according to a hierarchical structure of the distributed application system. When it has been determined that the application node has failed, the parent application node of the failed application node may be determined based on the hierarchical structure (e.g., the tree structure shown with reference to FIG. 1) describing connection relationships among the plurality of application nodes. Returning to FIG. 3, the parent application node (i.e., the datacenter 120) of the failed edge node 130 may be searched for in the hierarchical structure.

As shown by block 440 in FIG. 4, an additional mapping entry 320 describing an association relationship between the failed application node and the parent application node may be added to the node mapping relationship 310 of the distributed application system. Here, a mapping entry (e.g., a portion shown as a solid block in FIG. 3) in the node mapping relationship 310 may describe an association relationship between an application node among the plurality of application nodes and an address of the application node in the distributed application system. For example "EN001" may represent the name of the edge node 130, and the address of the edge node 130 is IPV/10.0.3.5. "DC" may represent the name of the datacenter 120, and the address of the datacenter 120 is IPV/10.0.2.5.

When it has been determined that the edge node 130 has failed, the additional entry 320 may be added to the node mapping relationship 310. The additional entry 320 may build an association relationship between the edge node 130 and the datacenter 120. When the edge node 130 with the name of "EN001" cannot be accessed, alternatively, the datacenter 120 with the name of "DC" may be accessed via the additional entry 320, so that the datacenter 120 may be utilized to replace the function of the edge node 130.

According to example implementations of the present disclosure, the function of the failed application node may be replaced using the parent application node. It will be understood that the access request may be provided in various types. More details will be provided below with respect to a write request, a processing request and a publishing request.

According to example implementations of the present disclosure, if it is determined that an access request to the failed application node is received, then the parent application node of the failed application node may be determined based on the additional mapping entry 320 in the node mapping relationship 310. Suppose an access request to the edge node 130 is received. In this event, the name "DC" of the parent application node of the edge node 130 may be found based on the additional entry 320. Subsequently, the address "IPV/10.0.2.5" of the parent application node in the distributed application system may be obtained based on a mapping entry 330 associated with the parent application node in the node mapping relationship 310. Subsequently, the access request that used to be sent to the edge node 130 may be forwarded to the datacenter 120 based on the address. More details about the data flow will be described with reference to FIG. 5 below.

Figure 5:
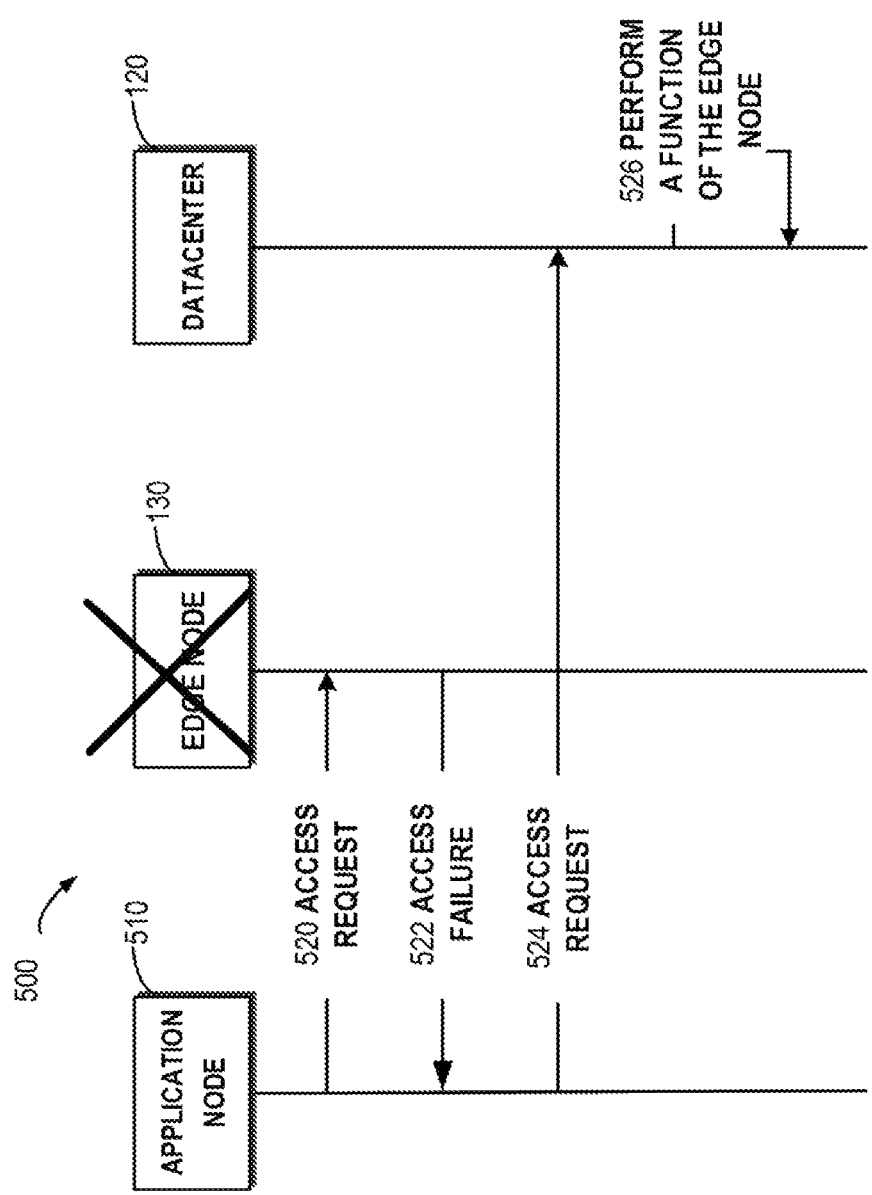
FIG. 5 schematically shows a block diagram of the process when a failed application node emerges in a distributed application system according to example implementations of the present disclosure.

FIG. 5 schematically shows a block diagram 500 of the process when a failed application node emerges in a distributed application system according to example implementations of the present disclosure. As depicted, an application node 510 may send 520 an access request to the edge node 130. If the edge node 130 fails to respond within a long time, then the application node 510 may receive 522 a signal indicating access failure. At this point, it may be determined that the edge node 130 has failed, and further the parent application node (i.e., the datacenter 120) of the edge node 130 may be found by a search in the node mapping relationship 310. Then, the access request that used to be directed at the edge node 130 may be sent 524 to the datacenter 120. At this point, the datacenter 120 may perform 526 the function of the edge node 130 in place of the edge node 130. For example, the datacenter 120 may receive one or more data objects from one or more other application nodes, process received one or more data objects so as to generate a data object and publish the same to the cloud.

Figure 6:
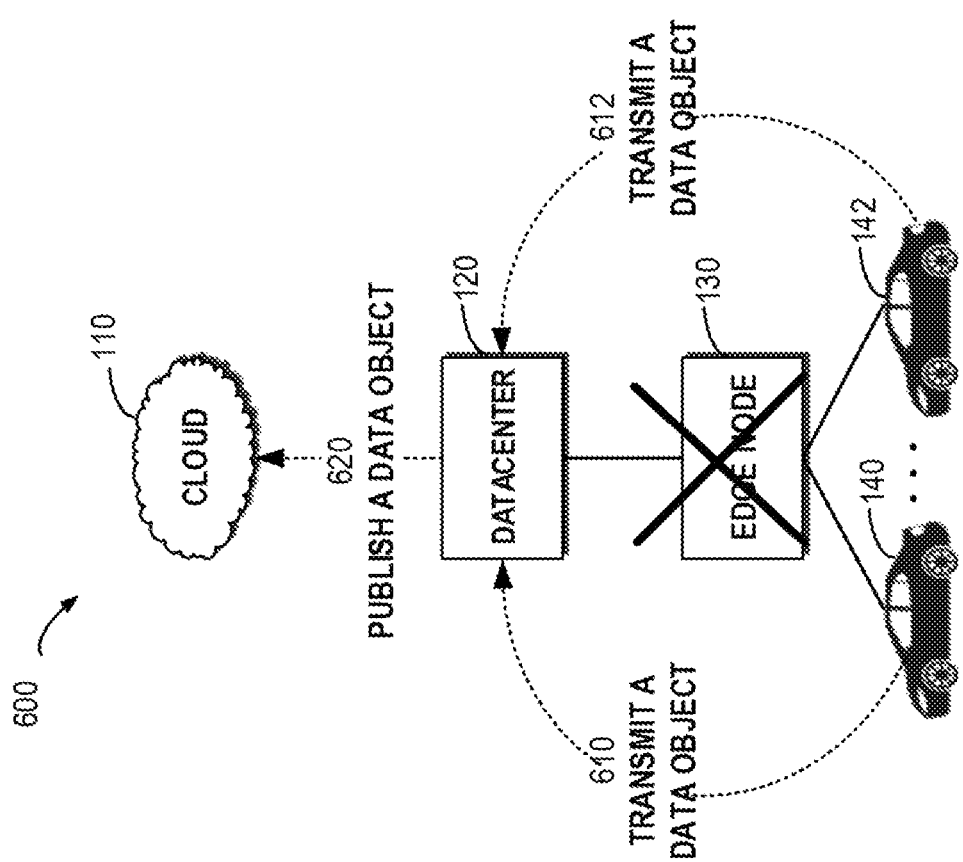
FIG. 6 schematically shows a block diagram of the process for performing a function of the failed application node by a parent application node according to example implementations of the present disclosure.

According to example implementations of the present disclosure, if the access request is determined as a write request for writing a data object to the failed application node, then the failed application node in the write request may be updated based on the parent application node. Specifically, FIG. 6 schematically shows a block diagram 600 of the process for the parent application node performing the function of the failed application node according to example implementations of the present disclosure. Suppose the application nodes 140 and 142 deployed on cars used to transmit collected data objects to the edge node 130, then at this point the data objects may be transmitted to the datacenter 120 as shown by arrows 610 and 620, respectively. The datacenter 120 may receive, in place of the edge node 130, the data objects from the application nodes 140 and 142.

According to example implementations of the present disclosure, if the access request is determined as a processing request for processing a data object by the failed application node, the parent application node may be instructed to process the data object. Still with reference to FIG. 6, the datacenter 120 may perform, in place of the edge node 130, the task of processing the received data object. For example, the datacenter 120 may generate a data object comprising more abundant environmental information, based on the data objects from the application nodes 140 and 142. At this point, although the edge node 130 has failed and cannot work, alternatively, its parent node may perform corresponding tasks.

With example implementations of the present disclosure, on the one hand, an alternative application node of the failed application node may be easily found in the distributed application system. On the other hand, since the datacenter 120 is the parent node of the failed edge node 130, and they are directly coupled to each other, transmitting data objects to the datacenter 120 will not cause excessive time overhead.

According to example implementations of the present disclosure, the method 400 described with reference to FIG. 4 may be performed iteratively. Suppose the found datacenter 120 fails, then a parent application node of the datacenter 120 may further be searched for based on the node mapping relationship 310, and the found parent application node may perform the respective functions of the edge node 130 and the datacenter 120.

According to example implementations of the present disclosure, if the access request is determined as a publishing request for publishing a data object to the distributed application system by the failed application node, then the parent application node may be instructed to publish the data object to the distributed application system on behalf of the failed application node. Still with reference to FIG. 6, where a new data object has been generated based on the data objects from the application nodes 140 and 142, the datacenter 120 may publish 620 the newly generated data object to the cloud 110.

Figure 7:
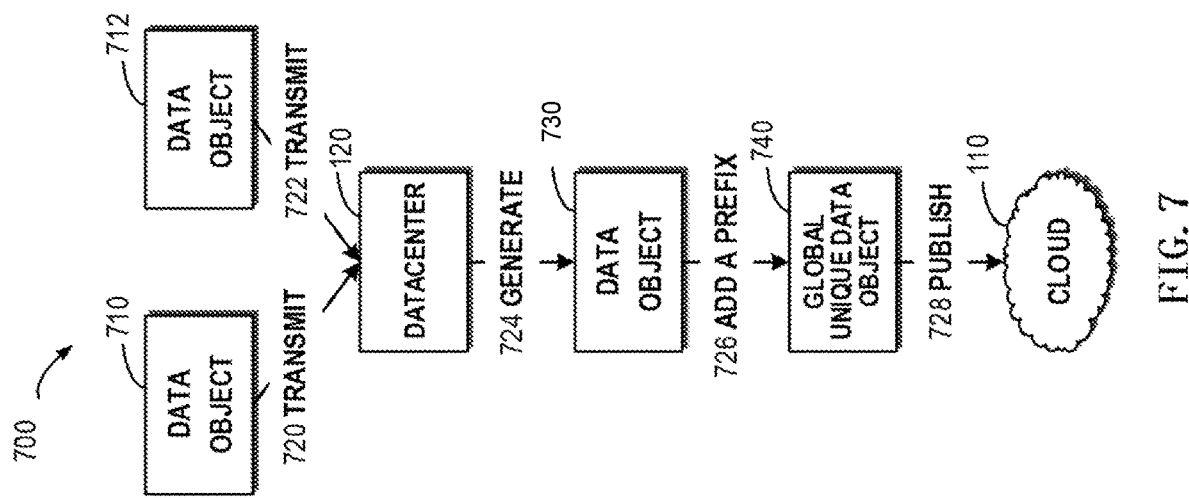
FIG. 7 schematically shows a block diagram of the process for publishing a data object by the parent application node according to example implementations of the present disclosure.

FIG. 7 schematically shows a block diagram 700 of the process for publishing a data object by a parent application node according to example implementations of the present disclosure. As shown by arrows 720 and 722 in FIG. 7, data objects 710 and 712 may be transmitted to the datacenter 120, respectively. The datacenter 120 may generate 724 a new data object 730 based on the received data objects 710 and 712. At the datacenter 120, a name of the data object may be generated based on the identifier of the failed application node (e.g., the name "EN001" of the edge node 130). Specifically, the datacenter 120 may add 726 a prefix, illustratively the prefix "EN001," to an original name of the data object on behalf of the edge node 130, so as to form a new name. For example, suppose the name of the new data object 730 is "D001," then the data object 730 may be renamed "EN001-D001" so as to form a global unique data object 740. Subsequently, the datacenter 120 may publish 728 the global unique data object 740 to the cloud 110 on behalf of the edge node 130.

It will be understood that the function of each application node in the distributed application system is configured in advance. Usually, a parent application node has a higher level and may grant a lower-level child application node a permission for performing some function(s). For example, the datacenter 120 may grant the edge node 130 a permission for publishing a data object. With example implementations of the present disclosure, since the datacenter 120 itself has the right to grant permission, the datacenter 120 may grant itself the permission for publishing a data object. In this way, without an extra authorization mechanism, the permission for performing functions related to a failed node may be granted to other application nodes in the distributed application system in an easy and effective way.

It will be understood that before a failure arises, the edge node 130 may have published many data objects, and names of these data objects comprise the prefix "EN001." In the distributed application system, since computing resources and storage resources are implemented in a distributed fashion, the large number of data objects comprising the prefix "EN001" may be moved and copied among various application nodes. Accordingly, a data object published by the edge node 130 may have a plurality of copies, which may be distributed over one or more application nodes in the distributed application system. At this point, the failure in the edge node 130 will not cause these copies to be lost. By means of the global unique data object name, the data object published by the edge node 130 may still be accessed from the distributed application system.

Figure 8:
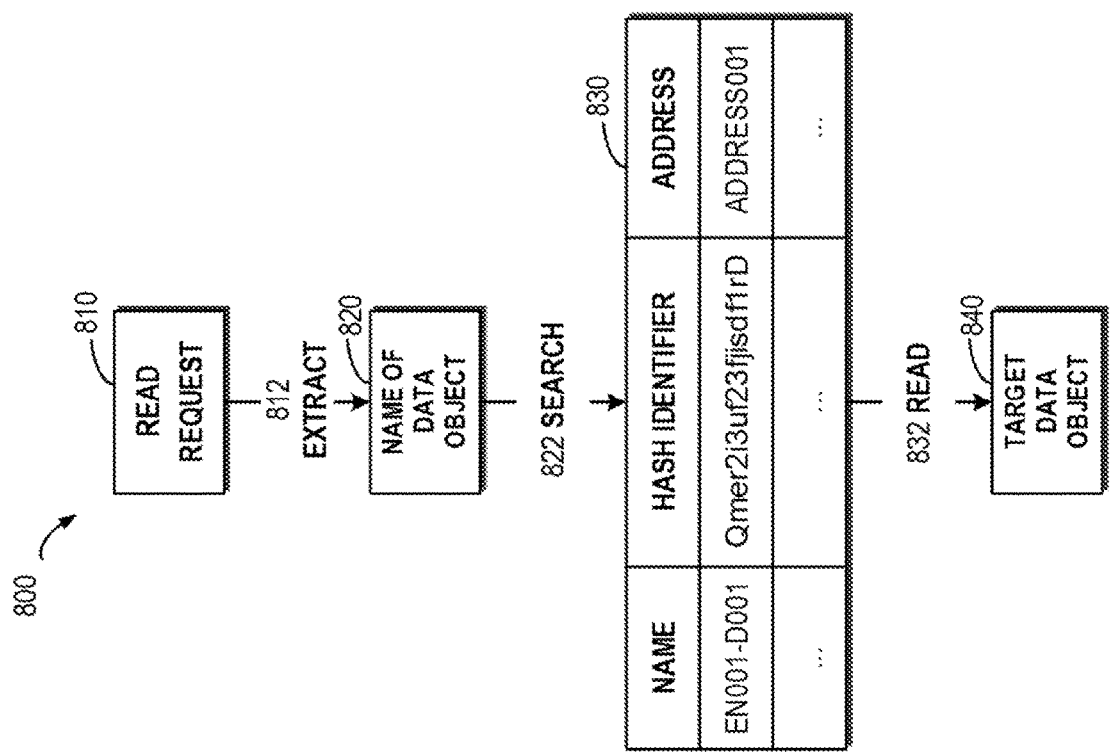
FIG. 8 schematically shows a block diagram of the process for accessing a data object in a distributed application system according to example implementations of the present disclosure.

According to example implementations of the present disclosure, if a read request for a data object in the distributed application system is received, then a hash identifier of the data object may be determined based on a name of the data object. FIG. 8 schematically shows a block diagram 800 of the process for accessing a data object in a distributed application system according to example implementations of the present disclosure. A read request 810 may be received, and then a name 820 of the data object may be extracted 812 from the read request 810. Suppose the read request 810 desires to access a data object with the name "EN001-D001," then the name "EN001-D001" may be extracted from the read request 810.

It will be understood that since the distributed application system may comprise one or more failed application nodes, when a target data object desired to be read resides on these failed application nodes, then the corresponding data object cannot be returned, but a failure notification may be provided. Specifically, an address of the target data object in the distributed application system may be determined based on the hash identifier. If the determined address points to the failed application node, then a failure notification is provided to a requester of the read request.

According to example implementations of the present disclosure, the distributed application system comprises a data object mapping relationship, a mapping entry in the data object mapping relationship describing an association relationship between a hash identifier of a data object in the distributed application system and an address of the data object in the distributed application system. According to example implementations of the present disclosure, the hash identifier is searched for in the data object mapping relationship so as to determine the address of the data object.

Still with reference to FIG. 8, by means of the name "EN001-D001" of the data object, a hash identifier corresponding to the name may be searched for 822 in the data object mapping relationship 830, and further a corresponding address may be found. As shown in FIG. 8, it may be determined that the hash identifier of the data object with the name "EN001-D001" is "Qmer2i3uf23fjisdflrD", and the address is "ADDRESS001." At this point, a target data object 840 specified in the read request 810 may be read 832 from the address "ADDRESS001" in the distributed application system. It will be understood that since the address "ADDRESS001" can uniquely represent the address of the data object in the distributed application system, an application node where the data object resides may be first determined based on the address. If the address points to the failed application node, then a failure notification may be returned; if the address points to a normal application node, then the application node may be accessed, and the read target data object may be returned.

The process with respect to a failed application node arising in the distributed application system has been described with reference to FIGS. 4 to 7. According to example implementations of the present disclosure, after the failed application node is recovered, the node mapping relationship 310 may be updated, so that the recovered application node can once again perform corresponding functions, instead of the parent application node of the failed application node performing those functions. According to example implementations of the present disclosure, if it is determined that the failed application node has been recovered, the additional mapping entry 320 may be deleted from the node mapping relationship 310. Returning to FIG. 3, suppose the failure in the edge node 130 has been eliminated, then the edge node 130 is recovered to normal, and the datacenter 120 is no longer needed to perform the function of the edge node 130.

According to example implementations of the present disclosure, in order to enable the edge node 130 to regain its functions, the parent application node may further be instructed to recover the function of the application node. For example, the datacenter 120 may grant the edge node 130 the permission for receiving, processing and publishing a data object. With example implementations of the present disclosure, after the failure in the distributed application system is overcome, the edge node 130 may still perform its various functions. According to example implementations of the present disclosure, status of various application nodes in the distributed application system may be periodically monitored. Once a failed application node is detected, then the failed application node may be replaced with its parent application node based on the above method 400.

The additional mapping entry 320 may be removed from the node mapping relationship 310, at which point the association relationship between the edge node 130 and the datacenter 120 no longer exists. When a certain application node sends an access request to the edge node 130, the address of the edge node 130 may be directly determined as "IPV/10.0.3.5" based on the updated node mapping 310. At this point, the access request may be directly sent to the edge node 130 instead of the datacenter 120. With example implementations of the present disclosure, if the failure in the distributed application system has been recovered, then the operation of the whole distributed application system will quickly return to normal, and each application node may continue to perform its own function.

While examples of the method according to the present disclosure have been described in detail with reference to FIGS. 2 to 8, description is presented below for the implementation of a corresponding apparatus. According to example implementations of the present disclosure, an apparatus is provided for managing application nodes in a distributed application system. The apparatus comprises: an obtaining module configured to obtain status of a plurality of application nodes in the distributed application system; a determining module configured to determine a failed application node among the plurality of application nodes based on the obtained status; a node determining module configured to determine a parent application node of the failed application node according to a hierarchical structure of the distributed application system, the hierarchical structure describing connection relationships among the plurality of application nodes; and an adding module configured to add, to a node mapping relationship of the distributed application system, an additional mapping entry that describes an association relationship between the failed application node and the parent application node, a mapping entry in the node mapping relationship describing an association relationship between an application node among the plurality of application nodes and an address of the application node in the distributed application system. In some embodiments, an association relationship is established between the failed application node and the parent application node, so that the parent application node may perform the function of the failed application node in the future.

According to example implementations of the present disclosure, the apparatus further comprises: a searching module configured to, in accordance with determining that an access request to the failed application node is received, determine the parent application node of the failed application node based on the additional mapping entry in the node mapping relationship; an address determining module configured to obtain an address of the parent application node in the distributed application system based on a mapping entry associated with the parent application node in the node mapping relationship; and a forwarding module configured to forward the access request to the address of the parent application node.

According to example implementations of the present disclosure, the apparatus further comprises: a performing module configured to perform a function of the failed application node by using the parent application node.

According to example implementations of the present disclosure, the performing module comprises: a write performing module configured to, in accordance with determining that the access request is a write request for writing a data object to the failed application node, update the failed application node in the write request based on the parent application node so as to write the data object to the parent application node.

According to example implementations of the present disclosure, the performing module comprises: a process performing module configured to, in accordance with determining that the access request is a processing request for processing a data object by the failed application node, instruct the parent application node to process the data object.

According to example implementations of the present disclosure, the performing module comprises: a publish performing module configured to, in accordance with determining that the access request is a publishing request for publishing a data object to the distributed application system by the failed application node, instruct the parent application node to publish the data object to the distributed application system on behalf of the failed application node.

According to example implementations of the present disclosure, the publish performing module further comprises: a naming module configured to instruct the parent application node to generate a name of the data object based on an identifier of the failed application node; and a publishing module configured to publish the data object to the distributed application system.

According to example implementations of the present disclosure, the apparatus further comprises: a removing module configured to, in accordance with determining that the failed application node is recovered, remove the additional mapping entry from the node mapping relationship; and a recovering module configured to instruct the parent application node to recover a function of the application node.

According to example implementations of the present disclosure, the apparatus further comprises: a hash determining module configured to, in accordance with determining that a read request for a target data object in the distributed application system is received, determine a hash identifier of the target data object based on a name of the target data object; a data object address determining module configured to determine an address of the target data object in the distributed application system based on the hash identifier; and a notifying module configured to, in accordance with determining that the address points to the failed application node, provide a failure notification to a requester of the read request.

According to example implementations of the present disclosure, the distributed application system comprises a data object mapping relationship, a mapping entry in the data object mapping relationship describing an association relationship between a hash identifier of a data object in the distributed application system and an address of the data object in the distributed application system.

According to example implementations of the present disclosure, the data object address determining module further comprises: an address searching module configured to search for the hash identifier in the data object mapping relationship so as to determine the address of the target data object.

Figure 9:
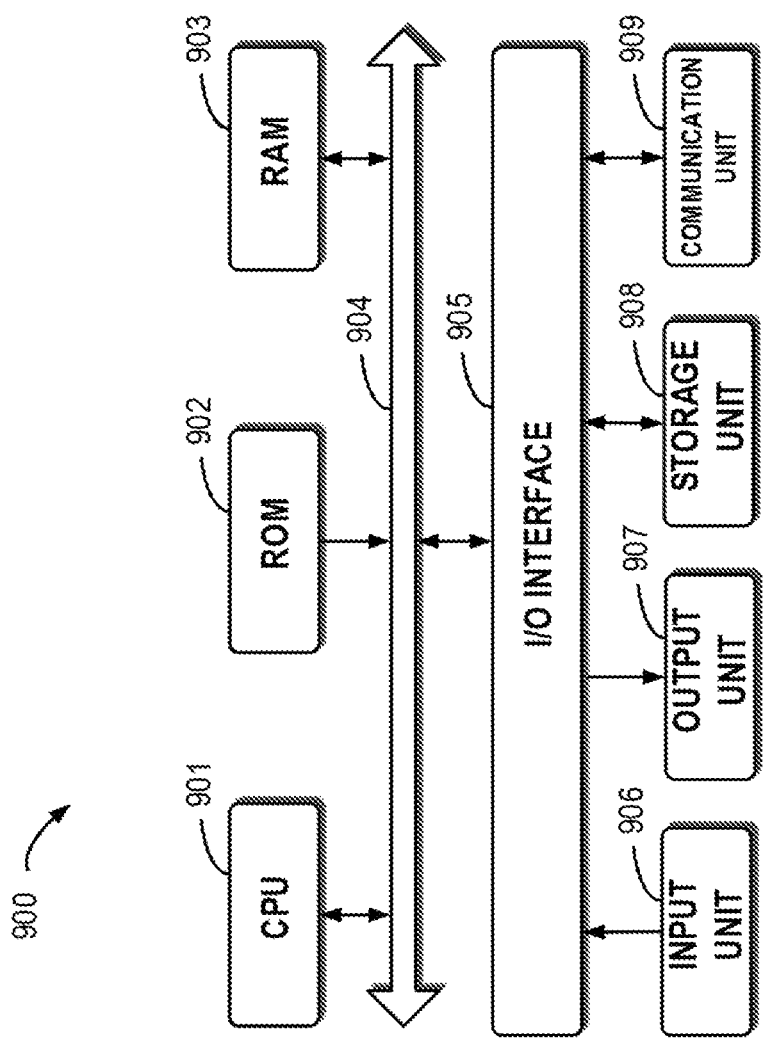
FIG. 9 schematically shows a block diagram of a device for managing application nodes in a distributed application system according to example implementations of the present disclosure.

FIG. 9 schematically shows a block diagram of a device 900 for managing application nodes in a distributed application system according to example implementations of the present disclosure. As depicted, the device 900 includes a central processing unit (CPU) 901, which can execute various suitable actions and processing based on the computer program instructions stored in the read-only memory (ROM) 902 or computer program instructions loaded in the random-access memory (RAM) 903 from a storage unit 908. The RAM 903 can also store all kinds of programs and data required by the operations of the device 900. CPU 901, ROM 902 and RAM 903 are connected to each other via a bus 904. The input/output (I/O) interface 905 is also connected to the bus 904.

A plurality of components in the device 900 are connected to the I/O interface 905, including: an input unit 906, such as a keyboard, mouse and the like; an output unit 907, e.g., various kinds of displays and loudspeakers etc.; a storage unit 908, such as a magnetic disk and optical disk, etc.; and a communication unit 909, such as a network card, modem, wireless transceiver and the like. The communication unit 909 allows the device 900 to exchange information/data with other devices via the computer network, such as Internet, and/or various telecommunication networks.

The above-described processes and treatments, such as the method 400, can also be executed by the processing unit 901. For example, in some implementations, the method 400 can be implemented as a computer software program tangibly included in the machine-readable medium, e.g., the storage unit 908. In some implementations, the computer program can be partially or fully loaded and/or mounted to the device 900 via ROM 902 and/or the communication unit 909. When the computer program is loaded to the RAM 903 and executed by the CPU 901, one or more steps of the above-described method 400 can be implemented. Alternatively, in other implementations, the CPU 901 can also be configured in other suitable ways to realize the above procedure/method.

According to example implementations of the present disclosure, an electronic device is provided, the electronic device comprising: at least one processor; and a memory coupled to the at least one processor, the memory having instructions stored thereon, the instructions, when executed by the at least one processor, causing the electronic device to perform acts for managing application nodes in a distributed application system. The acts include: obtaining status of a plurality of application nodes in the distributed application system; determining a failed application node among the plurality of application nodes based on the obtained status; determining a parent application node of the failed application node according to a hierarchical structure of the distributed application system, the hierarchical structure describing connection relationships among the plurality of application nodes; and adding to a node mapping relationship of the distributed application system an additional mapping entry that describes an association relationship between the failed application node and the parent application node, a mapping entry in the node mapping relationship describing an association relationship between an application node among the plurality of application nodes and an address of the application node in the distributed application system.

According to example implementations of the present disclosure, the acts further comprise: in accordance with determining that an access request to the failed application node is received, determining the parent application node of the failed application node based on the additional mapping entry in the node mapping relationship; obtaining an address of the parent application node in the distributed application system based on a mapping entry associated with the parent application node in the node mapping relationship; and forwarding the access request to the address of the parent application node.

According to example implementations of the present disclosure, the acts further comprise: performing a function of the failed application node by using the parent application node.

According to example implementations of the present disclosure, performing the function of the failed application node by using the parent application node comprises: in accordance with determining that the access request is a write request for writing a data object to the failed application node, updating the failed application node in the write request based on the parent application node so as to write the data object to the parent application node.

According to example implementations of the present disclosure, performing the function of the failed application node by using the parent application node comprises: in accordance with determining that the access request is a processing request for processing a data object by the failed application node, instructing the parent application node to process the data object.

According to example implementations of the present disclosure, performing the function of the failed application node by using the parent application node comprises: in accordance with determining that the access request is a publishing request for publishing a data object to the distributed application system by the failed application node, instructing the parent application node to publish the data object to the distributed application system on behalf of the failed application node.

According to example implementations of the present disclosure, instructing the parent application node to publish the data object to the distributed application system on behalf of the failed application node comprises: instructing the parent application node to generate a name of the data object based on an identifier of the failed application node; and publishing the data object to the distributed application system.

According to example implementations of the present disclosure, the acts further comprise: in accordance with determining that the failed application node is recovered, removing the additional mapping entry from the node mapping relationship; and instructing the parent application node to recover a function of the application node.

According to example implementations of the present disclosure, the acts further comprise: in accordance with determining that a read request for a target data object in the distributed application system is received, determining a hash identifier of the target data object based on a name of the target data object; determining an address of the target data object in the distributed application system based on the hash identifier; and in accordance with determining that the address points to the failed application node, providing a failure notification to a requester of the read request.

According to example implementations of the present disclosure, the distributed application system comprises a data object mapping relationship, a mapping entry in the data object mapping relationship describing an association relationship between a hash identifier of a data object in the distributed application system and an address of the data object in the distributed application system; and wherein determining an address of the target data object in the distributed application system based on the hash identifier comprises: searching for the hash identifier in the data object mapping relationship so as to determine the address of the target data object.

According to example implementations of the present disclosure, there is provided a computer program product. The computer program product is tangibly stored on a non-transitory computer-readable medium and comprises machine-executable instructions which are used to implement the method according to the present disclosure.

According to example implementations of the present disclosure, there is provided a computer-readable medium. The computer-readable medium has machine-executable instructions stored thereon, the machine-executable instructions, when executed by at least one processor, causing the at least one processor to implement the method according to the present disclosure.

The present disclosure can be a method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, an electrical storage device, magnetic storage device, optical storage device, electromagnetic storage device, semiconductor storage device or any appropriate combinations of the above. More concrete examples of the computer-readable storage media (non-exhaustive list) include: portable computer disk, hard disk, RAM, ROM, erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combination of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including local area network (LAN) and wide area network (WAN), or to the external computer (e.g., connected via Internet using an Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow charts and/or block diagrams of method, apparatus (system) and computer program products according to implementations of the present disclosure. It should be understood that each block of the flow charts and/or block diagrams and the combination of various blocks in the flow charts and/or block diagrams can be implemented by computer-readable program instructions.

The computer-readable program instructions can be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular way, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, the other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow charts and block diagrams in the drawings illustrate system architecture, functions and operations that may be implemented by system, method and computer program products according to a plurality of implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order depending on the functions involved. It should also be noted that each block in the block diagram and/or flow chart and combinations of the blocks in the block diagram and/or flow chart can be implemented by a hardware-based system exclusively for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, will be apparent to those skilled in the art. The selection of terms in the text aims to best explain principles and actual applications of each implementation and technical improvements made in the market by each implementation, and to otherwise enable those of ordinary skill in the art to understand implementations of the present disclosure.

What is claimed is:

1. A method for managing application nodes in a distributed application system, the method comprising:
    obtaining status of a plurality of application nodes in the distributed application system;
    determining a failed application node among the plurality of application nodes based on the obtained status;
    determining a parent application node of the failed application node according to a hierarchical structure of the distributed application system, the hierarchical structure describing connection relationships among the plurality of application nodes; and
    adding to a node mapping relationship of the distributed application system an additional mapping entry that describes an association relationship between the failed application node and the parent application node, a mapping entry in the node mapping relationship describing an association relationship between an application node among the plurality of application nodes and an address of the application node in the distributed application system, the additional mapping entry in the node mapping relationship associating an identifier of the failed application node with an identifier of the parent application node, the identifiers being different than addresses of the respective corresponding nodes.

2. The method of claim 1, further comprising:
    in accordance with determining that an access request to the failed application node is received, determining the parent application node of the failed application node based on the additional mapping entry in the node mapping relationship;
    obtaining an address of the parent application node in the distributed application system based on a mapping entry associated with the parent application node in the node mapping relationship; and
    forwarding the access request to the address of the parent application node.

3. The method of claim 1, further comprising: performing a function of the failed application node by using the parent application node.

4. The method of claim 3, wherein performing the function of the failed application node by using the parent application node comprises:
    in accordance with determining that the access request is a write request for writing a data object to the failed application node, updating the failed application node in the write request based on the parent application node so as to write the data object to the parent application node.

5. The method of claim 3, wherein performing the function of the failed application node by using the parent application node comprises:
    in accordance with determining that the access request is a processing request for processing a data object by the failed application node, instructing the parent application node to process the data object.

6. The method of claim 3, wherein performing the function of the failed application node by using the parent application node comprises:
    in accordance with determining that the access request is a publishing request for publishing a data object to the distributed application system by the failed application node, instructing the parent application node to publish the data object to the distributed application system on behalf of the failed application node.

7. The method of claim 6, wherein instructing the parent application node to publish the data object to the distributed application system on behalf of the failed application node comprises: instructing the parent application node to,
    generate a name of the data object based on the identifier of the failed application node; and
    publish the data object to the distributed application system.

8. The method of claim 1, further comprising:
    in accordance with determining that the failed application node is recovered, removing the additional mapping entry from the node mapping relationship; and
    instructing the parent application node to recover a function of the application node.

9. The method of claim 1, further comprising:
    in accordance with determining that a read request for a target data object in the distributed application system is received, determining a hash identifier of the target data object based on a name of the target data object;
determining an address of the target data object in the distributed application system based on the hash identifier; and
in accordance with determining that the address points to the failed application node, providing a failure notification to a requester of the read request.

10. The method of claim 9, wherein the distributed application system comprises a data object mapping relationship, a mapping entry in the data object mapping relationship describing an association relationship between a hash identifier of a data object in the distributed application system and an address of the data object in the distributed application system; and
wherein determining the address of the target data object in the distributed application system based on the hash identifier comprises: searching for the hash identifier in the data object mapping relationship so as to determine the address of the target data object.

11. An electronic device, comprising:
at least one processor; and
a memory coupled to the at least one processor, the memory having instructions stored thereon, the instructions, when executed by the at least one processor, causing the electronic device to implement acts for managing application nodes in a distributed application system, the acts comprising:
obtaining status of a plurality of application nodes in the distributed application system;
determining a failed application node among the plurality of application nodes based on the obtained status;
determining a parent application node of the failed application node according to a hierarchical structure of the distributed application system, the hierarchical structure describing connection relationships among the plurality of application nodes; and
adding to a node mapping relationship of the distributed application system an additional mapping entry that describes an association relationship between the failed application node and the parent application node, a mapping entry in the node mapping relationship describing an association relationship between an application node among the plurality of application nodes and an address of the application node in the distributed application system, the additional mapping entry in the node mapping relationship associating an identifier of the failed application node with an identifier of the parent application node, the identifiers being different than addresses of the respective corresponding nodes.

12. The electronic device of claim 11, the acts further comprising:
in accordance with determining that an access request to the failed application node is received, determining the parent application node of the failed application node based on the additional mapping entry in the node mapping relationship;
obtaining an address of the parent application node in the distributed application system based on a mapping entry associated with the parent application node in the node mapping relationship; and
forwarding the access request to the address of the parent application node.

13. The electronic device of claim 11, the acts further comprising: performing a function of the failed application node by using the parent application node.

14. The electronic device of claim 13, wherein performing the function of the failed application node by using the parent application node comprises:
in accordance with determining that the access request is a write request for writing a data object to the failed application node, updating the failed application node in the write request based on the parent application node so as to write the data object to the parent application node.

15. The electronic device of claim 13, wherein performing the function of the failed application node by using the parent application node comprises:
in accordance with determining that the access request is a processing request for processing a data object by the failed application node, instructing the parent application node to process the data object.

16. The electronic device of claim 13, wherein performing the function of the failed application node by using the parent application node comprises:
in accordance with determining that the access request is a publishing request for publishing a data object to the distributed application system by the failed application node, instructing the parent application node to publish the data object to the distributed application system on behalf of the failed application node.

17. The electronic device of claim 16, wherein instructing the parent application node to publish the data object to the distributed application system on behalf of the failed application node comprises: instructing the parent application node to,
generate a name of the data object based on the identifier of the failed application node; and
publish the data object to the distributed application system.

18. The electronic device of claim 11, the acts further comprising:
in accordance with determining that the failed application node is recovered, removing the additional mapping entry from the node mapping relationship; and
instructing the parent application node to recover a function of the application node.

19. The electronic device of claim 11, the acts further comprising:
in accordance with determining that a read request for a target data object in the distributed application system is received, determining a hash identifier of the target data object based on a name of the target data object;
determining an address of the target data object in the distributed application system based on the hash identifier; and
in accordance with determining that the address points to the failed application node, providing a failure notification to a requester of the read request.

20. A computer program product, tangibly stored on a non-transitory computer-readable medium and comprising machine-executable instructions, which when executed by a processor of an electronic device, cause the device to perform steps of:
obtaining status of a plurality of application nodes in a distributed application system;
determining a failed application node among the plurality of application nodes based on the obtained status;
determining a parent application node of the failed application node according to a hierarchical structure of the distributed application system, the hierarchical structure describing connection relationships among the plurality of application nodes; and adding to a node mapping relationship of the distributed application system an additional mapping entry that describes an association relationship between the failed application node and the parent application node, a mapping entry in the node mapping relationship describing an association relationship between an application node among the plurality of application nodes and an address of the application node in the distributed application system, the additional mapping entry in the node mapping relationship associating an identifier of the failed application node with an identifier of the parent application node, the identifiers being different than addresses of the respective corresponding nodes.

* * * * *